(12) United States Patent
Xiong et al.

(10) Patent No.: US 11,875,569 B2
(45) Date of Patent: *Jan. 16, 2024

(54) SMART VIDEO SURVEILLANCE SYSTEM USING A NEURAL NETWORK ENGINE

(71) Applicant: Western Digital Technologies, Inc., San Jose, CA (US)

(72) Inventors: Shaomin Xiong, San Jose, CA (US); Toshiki Hirano, San Jose, CA (US); Haoyu Wu, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,881

(22) Filed: Dec. 24, 2021

(65) Prior Publication Data

US 2022/0116569 A1    Apr. 14, 2022

Related U.S. Application Data

(63) Continuation of application No. 16/446,316, filed on Jun. 19, 2019, now Pat. No. 11,232,327.

(51) Int. Cl.
*G06V 20/52* (2022.01)
*H04N 7/18* (2006.01)
(Continued)

(52) U.S. Cl.
CPC ............ *G06V 20/52* (2022.01); *G06F 18/217* (2023.01); *G06T 7/70* (2017.01); *G06V 10/764* (2022.01);
(Continued)

(58) Field of Classification Search
None
See application file for complete search history.

(56) References Cited

U.S. PATENT DOCUMENTS 7,382,896 B2    6/2008 Ito et al.
8,619,140 B2 *  12/2013 Brown ................. G01S 3/7865
                                                            348/154
(Continued)

FOREIGN PATENT DOCUMENTS

CN    104159071 A    11/2014
GB      2554948 A     4/2018

OTHER PUBLICATIONS

Camboim et al.; "Cloud Computing Assisted Smart Surveillance Based Safe Transportation System to Improve Crime Assistance on Smart Cities"; Federal University of Rio Grande do Norte; Dec. 2015; 77 pages.

(Continued)

*Primary Examiner* — Wen W Huang
(74) *Attorney, Agent, or Firm* — Barry IP Law, P.C.

(57) ABSTRACT

A surveillance system includes at least one image or video capture device and a controller configured to determine a change in location for the at least one image or video capture device from a first location to a second location. First image or video data is received from the at least one image or video capture device at the second location, and in response to the location change, a preconfigured neural network is obtained or weights for a neural network are obtained based at least in part on the received first image or video data. Second image or video data is received from the at least one image or video capture device at the second location and an inference operation is performed on the second image or video data by processing the second image or video data using the obtained weights or the obtained preconfigured neural network.

17 Claims, 9 Drawing Sheets

(51) Int. Cl.
*G06V 40/10* (2022.01)
*G06T 7/70* (2017.01)
*G06V 10/82* (2022.01)
*G06V 10/764* (2022.01)
*G06F 18/21* (2023.01)
*G06V 10/776* (2022.01)

(52) U.S. Cl.
CPC .......... *G06V 10/776* (2022.01); *G06V 10/82* (2022.01); *G06V 40/10* (2022.01); *H04N 7/181* (2013.01); *G06T 2207/20081* (2013.01); *G06T 2207/20084* (2013.01); *G06T 2207/30232* (2013.01)

(56) References Cited

U.S. PATENT DOCUMENTS

| | | | |
|---|---|---|---|
| 10,636,173 B1 | 4/2020 | Beach et al. | |
| 2009/0041359 A1 | 2/2009 | Park | |
| 2011/0043625 A1* | 2/2011 | Cobb | G06T 7/254 382/209 |
| 2011/0043689 A1* | 2/2011 | Cobb | H04N 5/147 348/E7.003 |
| 2015/0086110 A1 | 3/2015 | Nishimura et al. | |
| 2015/0363670 A1* | 12/2015 | Sugishita | G06K 9/6257 382/218 |
| 2016/0042621 A1* | 2/2016 | Hogg | G06V 20/52 348/155 |
| 2016/0092726 A1* | 3/2016 | Li | G06V 10/42 345/156 |
| 2016/0283798 A1* | 9/2016 | Goldner | G06V 10/50 |
| 2017/0169358 A1 | 6/2017 | Choi et al. | |
| 2017/0213154 A1 | 7/2017 | Hammond et al. | |
| 2017/0264877 A1* | 9/2017 | Lee | G11B 27/10 |
| 2017/0270674 A1* | 9/2017 | Shrivastava | G06N 20/00 |
| 2018/0150695 A1* | 5/2018 | Guttmann | G06V 20/40 |
| 2018/0246964 A1* | 8/2018 | Teichman | G06F 16/73 |
| 2019/0138829 A1 | 5/2019 | Gurghian et al. | |
| 2019/0141241 A1 | 5/2019 | Lo et al. | |
| 2019/0258864 A1 | 8/2019 | Lee et al. | |
| 2020/0193643 A1* | 6/2020 | Hess | G01S 5/0284 |
| 2020/0388139 A1* | 12/2020 | Saha | H04N 7/188 |

OTHER PUBLICATIONS

Camboim et al.; "FISVER: A Framework for Smart Public Safety in Video-Surveilled Vehicles"; Department of Informatics and Applied Mathematics Federal University of Rio Grand do Norte; Dec. 2014; 6 pages.

Raj; "How to Automate Surveillance Easily with Deep Learning"; Aug. 3, 2018; 21 pages.

* cited by examiner

SMART VIDEO SURVEILLANCE SYSTEM USING A NEURAL NETWORK ENGINE

CROSS-REFERENCE TO RELATED APPLICATIONS

This application is a continuation of application Ser. No. 16/446,316, filed on Jun. 19, 2019, titled "SMART VIDEO SURVEILLANCE SYSTEM USING A NEURAL NETWORK ENGINE", the contents of which are hereby incorporated by reference in their entirety. Any and all applications for which a foreign or domestic priority claim is identified in the Application Data Sheet as filed with the present application are hereby incorporated by reference under 37 CFR 1.57.

TECHNICAL FIELD

The present disclosure relates to a neural network engine for a surveillance system, and more particularly, for remote neural network training for such engine.

BACKGROUND

Computer learning models can process large volumes of data. For example, a model may be implemented as an artificial neural network. Artificial neural networks are artificial in the sense that they are computational entities, inspired by biological neural networks but modified for implementation by computing devices. A neural network typically comprises an input layer, one or more hidden layer(s) and an output layer. The nodes in each layer connect to nodes in the subsequent layer and the strengths of these interconnections are typically learnt from data during the training process. Once trained, a neural network can be used for inference, that is, provided with new input data in order to predict the corresponding output.

Machine learning techniques, such as neural networks, are frequently being utilized by modern computing systems. These technologies can operate on large data sets and thus can require large amounts of storage space. However, current memory architectures do not allow for scalability of big data analysis. The present disclosure addresses these and other problems.

SUMMARY

The systems, methods, and devices of this disclosure each have several innovative aspects, no single one of which is solely responsible for all of the desirable attributes disclosed herein.

A surveillance system can include at least one image or video capture device and a controller configured to determine a change in location for the at least one image or video capture device from a first location to a second location different from the first location. First image or video data is transmitted to a remote or local server with the first image or video data being received from the at least one image or video capture device at the second location. Responsive to the change in location, a preconfigured neural network is received from the server or weights for a neural network are received from the server. Second image or video data is received from the at least one image or video capture device at the changed location and an inference operation is performed by the controller on the second image or video data by processing the second image or video data using the weights or the preconfigured neural network received from the server.

According to another aspect, a surveillance system includes at least one image or video capture device and a controller configured to determine a change in location for the at least one image or video capture device from a first location to a second location different from the first location. First image or video data is received from the at least one image or video capture device at the second location, and in response to the change in location, a preconfigured neural network is obtained or weights for a neural network are obtained based at least in part on the received first image or video data at the second location. Second image or video data is received from the at least one image or video capture device at the second location and an inference operation is performed by the controller on the second image or video data by processing the second image or video data using the obtained weights or the obtained preconfigured neural network.

A method of performing neural network computations in a surveillance system can comprise: storing a plurality of weights of a neural network in a memory device for processing images or video from at least one image or video capture device; determining a change in location for the at least one image or video capture device; storing in the memory device first image or video data received from the at least one image or video capture device at the changed location; transmitting the first image or video data to a remote server; receiving, from the remote server, updated weights for the neural network responsive to the change in the location, wherein the remote server retrains the neural network based on the first image or video data at the changed location; storing the updated weights for the neural network into the memory device; receiving second image or video data from the at least one image or video capture device at the changed location; and performing an inference operation on the second image or video data by processing the second image or video data in the neural network using the updated weights, wherein the method is performed by one or more hardware processors.

In the method of the preceding paragraph or any of the paragraphs herein, the inference operation can be performed locally at the surveillance system.

In the method of the preceding paragraph or any of the paragraphs herein, determining the change in the location can be based on user input.

In the method of the preceding paragraph or any of the paragraphs herein, determining the change in the location can be based on data received from a global positioning system (GPS) device of the surveillance system.

In the method of the preceding paragraph or any of the paragraphs herein, the change in the location can be automatically determined based on a determination of a change in a background of the first image or video data.

In the method of the preceding paragraph or any of the paragraphs herein, retraining the neural network can be further based on an indication of a change in an inference operation type of the neural network.

In the method of the preceding paragraph or any of the paragraphs herein, the change of the inference operation can include at least one of: a change of object to be detected or a change of an angle view of the at least one image or video capture device.

In the method of the preceding paragraph or any of the paragraphs herein, retraining the neural network can be based on a real-time video stream from the at least one image or video capture device.

In the method of the preceding paragraph or any of the paragraphs herein, retraining the neural network can be performed without an indication of an object present in the first image or video data.

A neural network computations systems for a surveillance system can comprise one or more hardware processors configured to: store a plurality of weights of a neural network in a memory device for processing images or video from at least one image or video capture device; determine a change in location for the at least one image or video capture device; store first image or video data received from the at least one image or video capture device at the changed location; transmit the first image or video data to a cloud server; receive, from the cloud server, updated weights for the neural network responsive to the change in the location, wherein the cloud server retrains the neural network based on the first image or video data at the changed location; store the updated weights for the neural network into the memory device; receive second image or video data from the at least one image or video capture device at the changed location; and perform an inference operation on the second image or video data by processing the second image or video data in the neural network using the updated weights.

In the system of the preceding paragraph or any of the paragraphs herein, the first image or video data can be stored on the cloud server.

In the system of the preceding paragraph or any of the paragraphs herein, the one or more hardware processors can be configured to store a plurality of preconfigured weights.

In the system of the preceding paragraph or any of the paragraphs herein, the at least one image or video capture device can be configured to transmit the first image or video data to the one or more hardware processors via wireless communication.

In the system of the preceding paragraph or any of the paragraphs herein, the inference operation can include identifying an age or gender of a human in the second image or video data.

In the system of the preceding paragraph or any of the paragraphs herein, the change in location can include at least one of: a change in view angle of at least one of the at least one image or video capture device or a change in location outside of a previous view for the at least one image or video capture device.

A system for performing neural network computations for surveillance can comprise: means for storing a plurality of weights of a neural network into a memory device for processing images or video from at least one image or video capture device; means for determining a change in location for the at least one image or video capture device; means for retraining the neural network; means for loading updated weights for the neural network; means for receiving first image or video data from the at least one image or video capture device at the changed location responsive to the change in the location; and means for performing an inference operation on the first image or video data by processing the first image or video data in the neural network using the updated weights.

In the system of the preceding paragraph or any of the paragraphs herein, the means for retraining the neural network can be further for retrieving weights for another preconfigured neural network stored in the memory device.

In the system of the preceding paragraph or any of the paragraphs herein, the means for retraining the neural network can be further for retrieving weights for another preconfigured neural network stored in the memory device.

In the system of the preceding paragraph or any of the paragraphs herein, the means for retraining the neural network can be further for retraining based on user inputted data.

In the system of the preceding paragraph or any of the paragraphs herein, the system can further comprise: means for storing second image or video data received from the at least one image or video capture device at the changed location, wherein means for retraining the neural network is further for generating the updated weights based on the second image or video data at the changed location.

BRIEF DESCRIPTION OF DRAWINGS

Embodiments of various inventive features will now be described with reference to the following drawings and appendices. Throughout the drawings, reference numbers may be re-used to indicate correspondence between referenced elements. The drawings are provided to illustrate example embodiments described herein and are not intended to limit the scope of the disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

The need for surveillance systems is increasing, with increased capabilities of surveillance system being able to provide higher data processing. Existing surveillance systems can connect to multiple cameras wirelessly, and the cameras can provide images and videos to a controller of the surveillance systems wirelessly. One key change to recent surveillance systems were the introduction of artificial intelligence data processing to surveillance systems. These surveillance systems can perform inference operations and other neural network computations to analyze image and/or video data to provide important information to the user, such as a prediction of a type of object that has entered the scene.

One drawback to existing surveillance systems is that the surveillance systems typically send the image and/or video data to a remote system for further data processing. The surveillance systems receive the image and/or video data from image and/or video capture devices, such as a camera, and sends the image and/or video data to a cloud server. The cloud server processes this data through their neural network and sends back results of the data processing to the surveillance systems. The data throughput required to send the image and/or video data to the remote system is quite large, especially with the increased resolution capabilities of modern-day cameras. Moreover, because all image and/or video data is being sent to a remote server, there are potential privacy and internet security issues if there is a breach of data.

In other surveillance systems, the data processing can be performed locally by the surveillance systems and not on a remote server. A drawback to this approach is that the data processing is typically very simple. Moreover, these surveillance systems typically do not retrain the neural network for new circumstances, such as a change in location. Retraining the neural network typically requires high computational power, such as forward and backward propagating of data through the neural network using a training data set. Thus, these systems are usually limited to application in set scenarios and run only a fixed neural network that has already been preprogrammed.

Some systems and methods described herein mitigate and/or eliminate one or more drawbacks for existing systems. The present disclosure includes systems and methods for enabling remote training and retraining of neural networks, while processing data in real life using the trained and retrained neural networks locally at the surveillance system.

In some cases, a surveillance system can include a controller and one or more video and/or image capture devices. The one or more video and/or image capture devices can capture image and/or video data and send the image and/or video data to a controller. The image and/or video data can be transmitted wirelessly from the one or more image and/or video capture devices to the controller. In some embodiments, the image and/or video data can be transmitted via wired communication.

In some cases, the controller can process the video and/or image data via a neural network in order to perform inference operations. The neural network can perform object detection on the data. For example, the neural network can determine a particular type of car entered a car parking lot.

In some cases, the surveillance system can determine a change of location for at least one of the image and/or video capture devices. The surveillance system can receive an indication of a change of location from a user or customer. In some cases, the surveillance system can automatically determine a change of location by performing inference operations on the video and/or image data, such as identifying different furniture that was previously identified in the image. In some cases, the surveillance system can determine a change of location based on locational information, such as a positioning system, a global positioning system (GPS), or other system that can provide locational information.

In some cases, the surveillance system can retrain the neural network and/or initiate the retraining of the neural network. The retraining can be based upon a consumer request, a consumer indication of a change of an inference operation type (such as changing from car identification to person identification), or from a change of location. The image and/or video data can be transmitted to a remote server, such as a cloud server, to retrain the neural network based on new image and/or video data taken from the new location.

In some cases, the remote server can transmit the retrained neural network and/or weights for nodes of the retrained neural network back to the surveillance system. The surveillance system can then update its neural network and process future image and/or video data based on the retrained neural network and/or weights. Advantageously, a subset of the image and/or video data needs to be transmitted remotely. Moreover, data processing can be custom tailored to the new location. Because data processing for future image and/or video data on the retrained neural network is performed locally, the data is more secure, less internet traffic is required, and the surveillance system can be retrained for any new scenario.

Surveillance System in Various Scenarios

Figure 1:
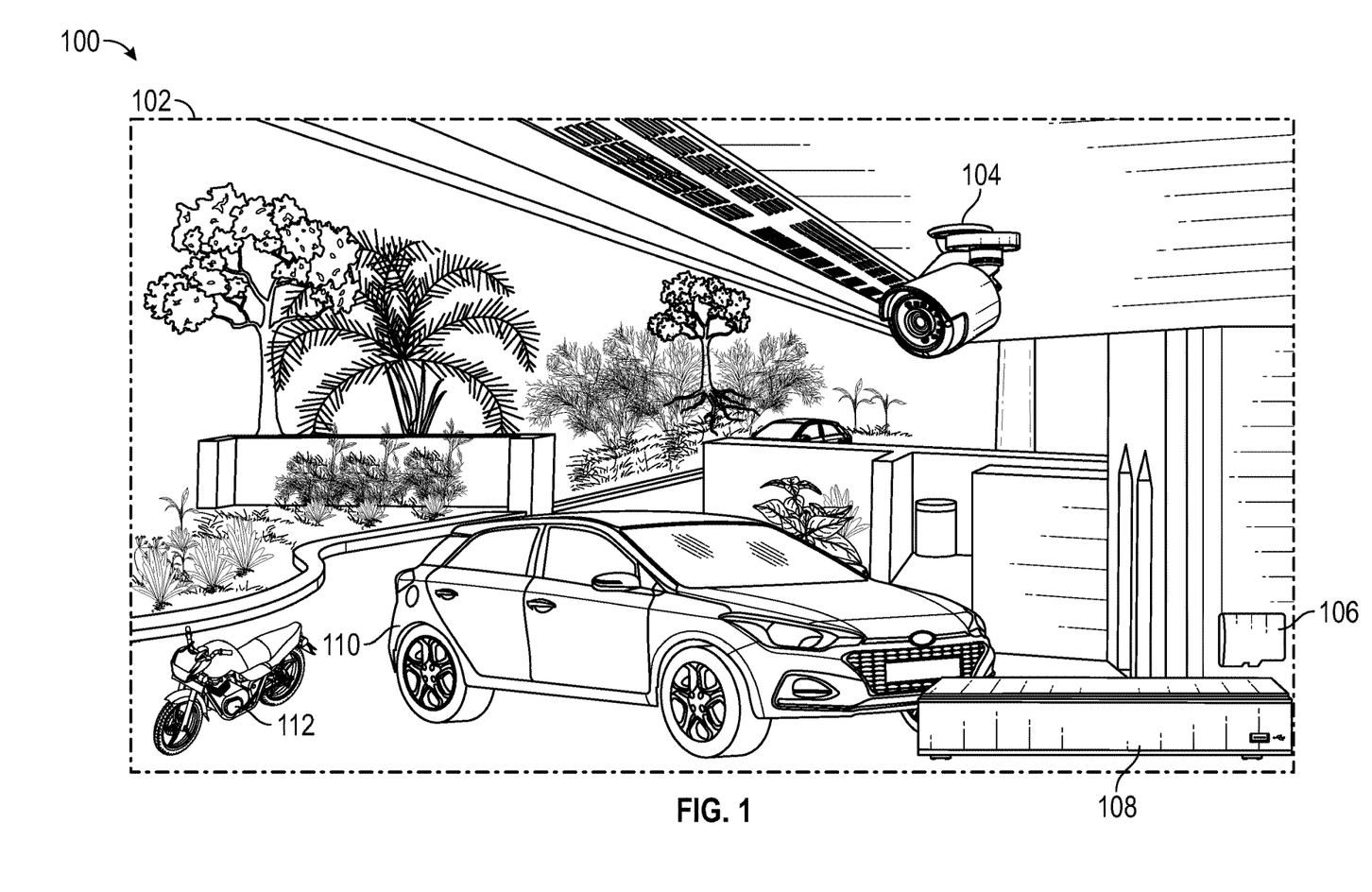
FIG. 1 depicts an illustration of a surveillance system in a driveway or garage.

FIG. 1 depicts an illustration 100 of a surveillance system in a driveway or garage. In the illustration 100, the surveillance system can include one or more image and/or video capture devices, such as camera 104 installed in the garage 102. The surveillance system can include a controller 108, such as a local processor, and a memory device 106, such as a memory chip, drive, or the like.

In some cases, the surveillance system of illustration 100 can include a neural network stored in the memory device 106, and can be retrieved and executed by the controller 108. The neural network of the surveillance system of illustration 100 can be trained to perform inference operations on image and/or video data captured by the one or more image and/or video capture devices, such as camera 104. The camera 104 can take a video of the garage and/or images at certain intervals. The camera 104 can wirelessly transmit such data to the controller 108 to be stored in the memory device 106.

In some cases, the controller 108 of the surveillance system of illustration 100 can process the image and/or video data stored in the memory device 106. The controller 108 can retrieve the image and/or video data from the memory device 106 and the neural network from the memory device 106. The controller 108 can perform inference operations by inputting the image and/or video data into the neural network. The neural network can assess the image and/or video data to determine whether a certain object is present. For example, the neural network can be trained to identify that a car 110 or a bike 112 has entered the garage.

In some cases, the neural network can be trained to perform one or more functions. For example, the neural network can be trained to identify an object type, such as to differentiate between a car 110 or a bike 112. The neural network can perform more detailed inferences, such as to identify a type of car, or certain characteristics of the car, such as a car's spoiler or rims. The neural network can be trained to output a single determination of a characteristic, such as the highest probability of a car type. The neural network can be trained to output a plurality of characteristics, such as various characteristics of the identified car.

In some cases, the neural network can be trained for a particular location. For example, the neural network can be trained for the garage 102. The neural network can identify certain objects that are typically present in the garage 102, such as a car 110 or a bike 112.

Figure 2:
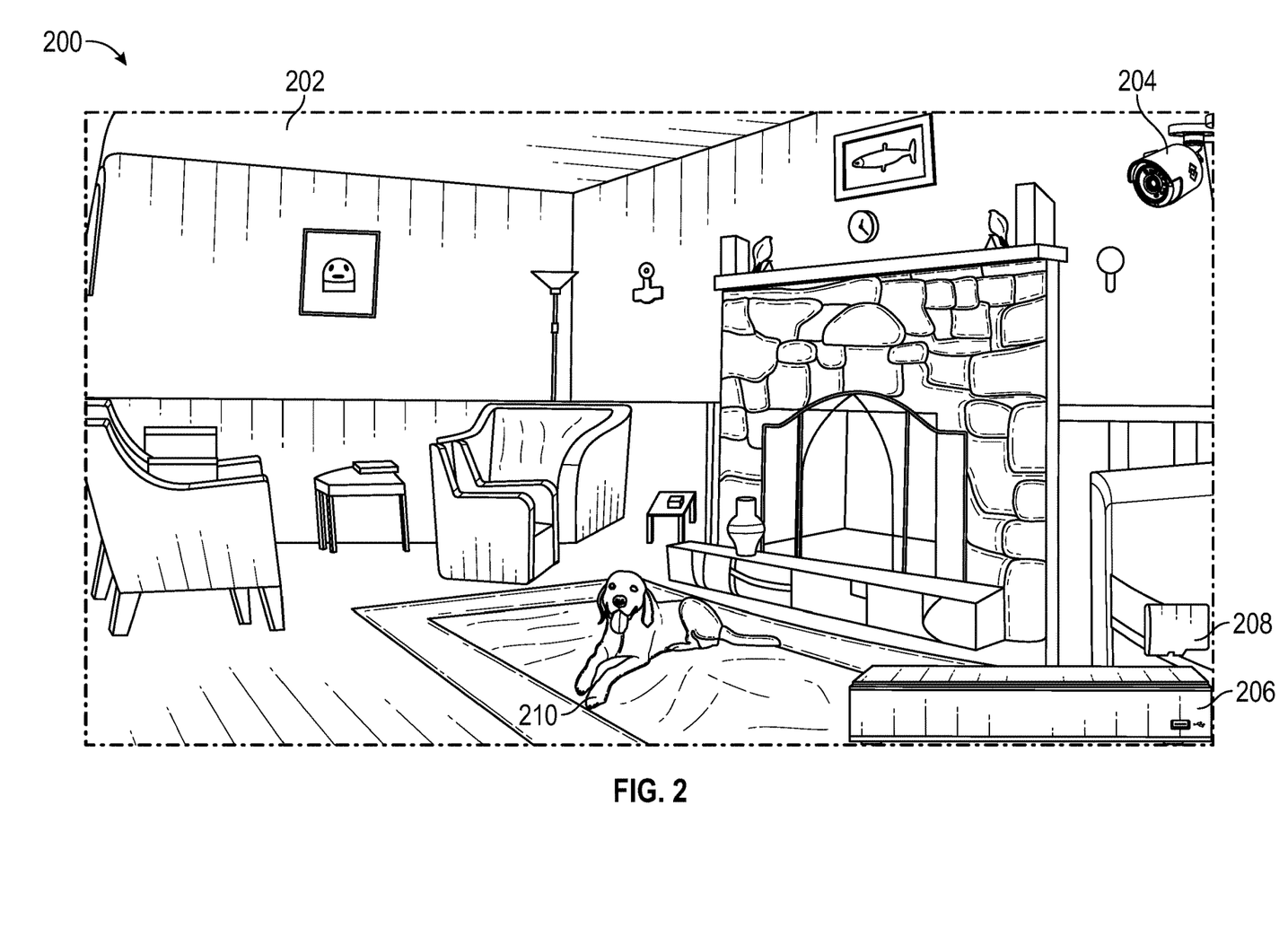
FIG. 2 depicts an illustration of a surveillance system in a living room.

FIG. 2 depicts an illustration 200 of a surveillance system in a living room 202. The surveillance system can be moved from the garage 102 of FIG. 1 to the living room 202 of FIG. 2.

In some cases, a change of location results in a change of positioning of the camera 104 of FIG. 1. For example, the camera 104 of FIG. 1 can be moved to a new position, such as the position shown of camera 204 of FIG. 2.

In some cases, the change of location can be determined by the surveillance system manually, such as based on a user's input of the change in location. The user can indicate the changes, such as the change to a living room, and/or changes to desired inference operations, such as to identify persons or a certain type of pet, such as a dog 210.

In some cases, the change of location can be automatically determined by the surveillance system. For example, the change of location can be determined by a change in a global positioning system. The global positioning system can be within a controller 206 of the surveillance system. The global positioning system can be installed in the one or more image and/or video capture devices, such as the camera 204 of FIG. 2.

In some cases, an image and/or video capture device, such as camera 204, can include an inertial navigation system. The camera 204 can determine that the camera 204 is oriented in a certain XYZ direction based on input from an inertial navigation system. As such, the camera 204 can determine the angle of the view for the living room 202.

In some cases, the change of location can be determined by the image and/or video data taken by the camera 204. For example, image and/or video data can be captured and transmitted by the camera 204. The controller 206 can receive the image and/or video data, retrieve a neural network for the garage 102 of FIG. 1, process the image and/or video data through the neural network, and determine that the objects detected in the garage 102 is no longer present in the living room, and that the living room includes other new objects that are typically not in the garage 102.

In some cases, based on a change of location, the surveillance system can determine a need to retrain the neural network, such as to retrain the neural network for the living room 202. The controller 206 can transmit the captured image and/or video data to a remote sever (not shown) for retraining.

In some cases, the remote server can retrain the neural network for the living room. The remote server can send the retrained neural network (and/or the weights for nodes of the retrained neural network) back to the controller 206. The controller 206 can store the retrained neural network into the memory device 208.

In some cases, with the retrained the neural network, the controller 206 can process future image and/or video data captured by the image and/or video capture devices, such as camera 204, locally and/or in real-time. The camera 204 can capture new image and/or video data, and the controller 206 now can identify that a dog 210 is present in a living room 202 based on processing the new image and/or video data through the retrained neural network.

Figure 3:
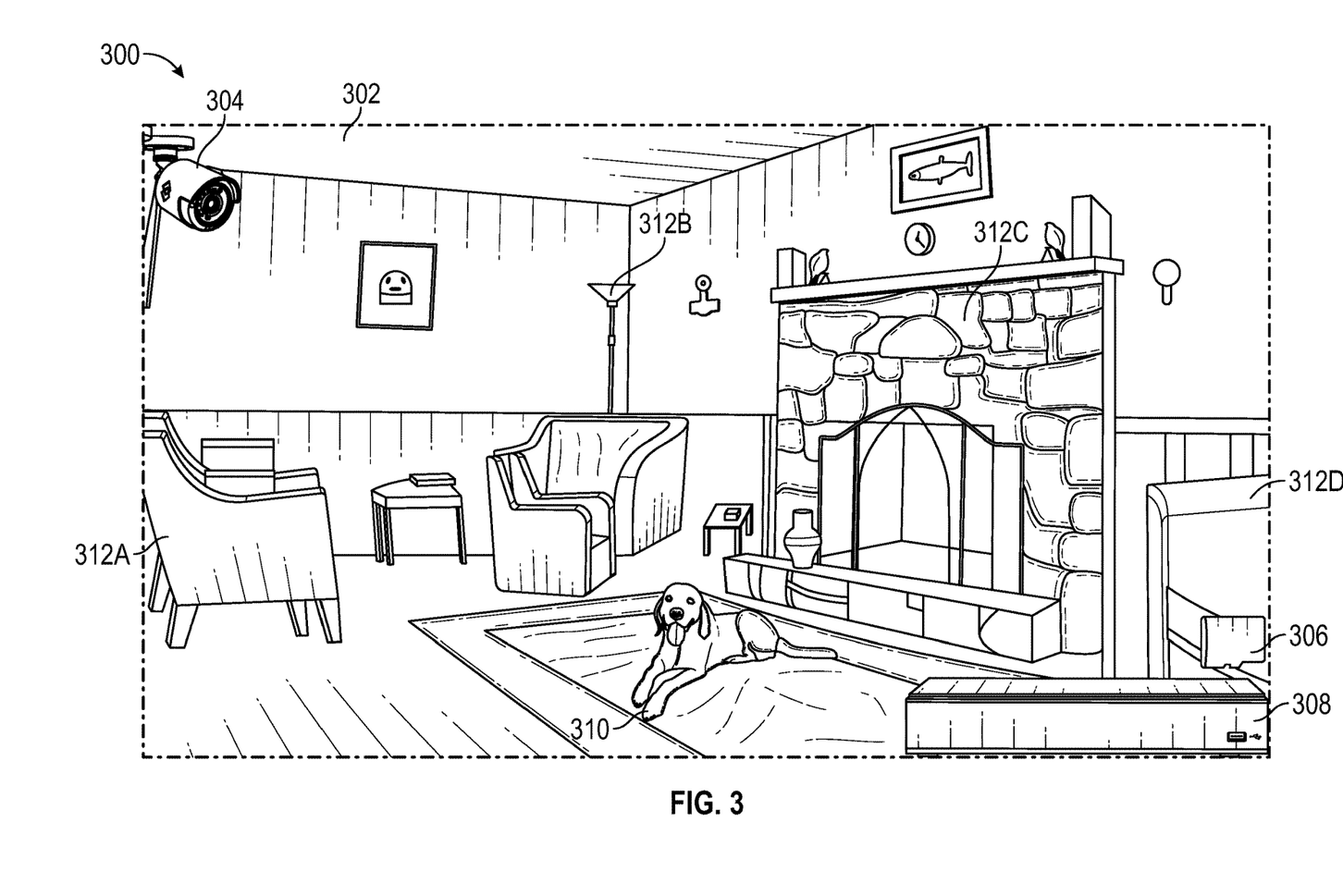
FIG. 3 depicts an illustration of a surveillance system in a living room positioned in a new view.

FIG. 3 depicts an illustration 300 of a surveillance system in a living room positioned in a new view. The camera 204 of FIG. 2 can be relocated within the same living room 202 of FIG. 2 to a new location for the camera 304 in FIG. 3.

In some cases, the surveillance system can identify a change of location, such as a change of location for one or more cameras. The surveillance system can receive image and/or video data from the camera 304 and can identify that the background of the living room has changed. The surveillance system can determine that the location has changed.

In some cases, the surveillance system can determine that although the background has changed, that the camera 304 is still in the same living room 302 as the living room 202 of FIG. 2. The surveillance system can determine that certain background features that were identified from the image and/or video data captured by the camera 304 in the new location are the same background features as the image and/or video data captured by the camera 204 of FIG. 2 in the previous location. For example, the camera 304 can determine that the chair 312A, the lamp 312B, fireplace 312C, and the couch 312D are present in the image and/or video data but in a different location.

In some cases, the surveillance system can use the same neural network for the position in FIG. 2 as in FIG. 3. In some cases, the surveillance system can retrain the neural network for the new view within the same living room 302. The surveillance system can capture new image and/or video data captured in the new view from camera 304. The new image and/or video data can be transmitted to a remote server (not shown) for retraining. The weights of the neural network can be newly generated and/or updated based on the new image and/or video data. The remote server can transmit the new weights back to the controller 308 and stored in the memory device 306. Then, the surveillance system can perform inference operations based on the camera 304 capturing image and/or video data in the new view.

Remote Retraining of the Neural Network

Figure 4:
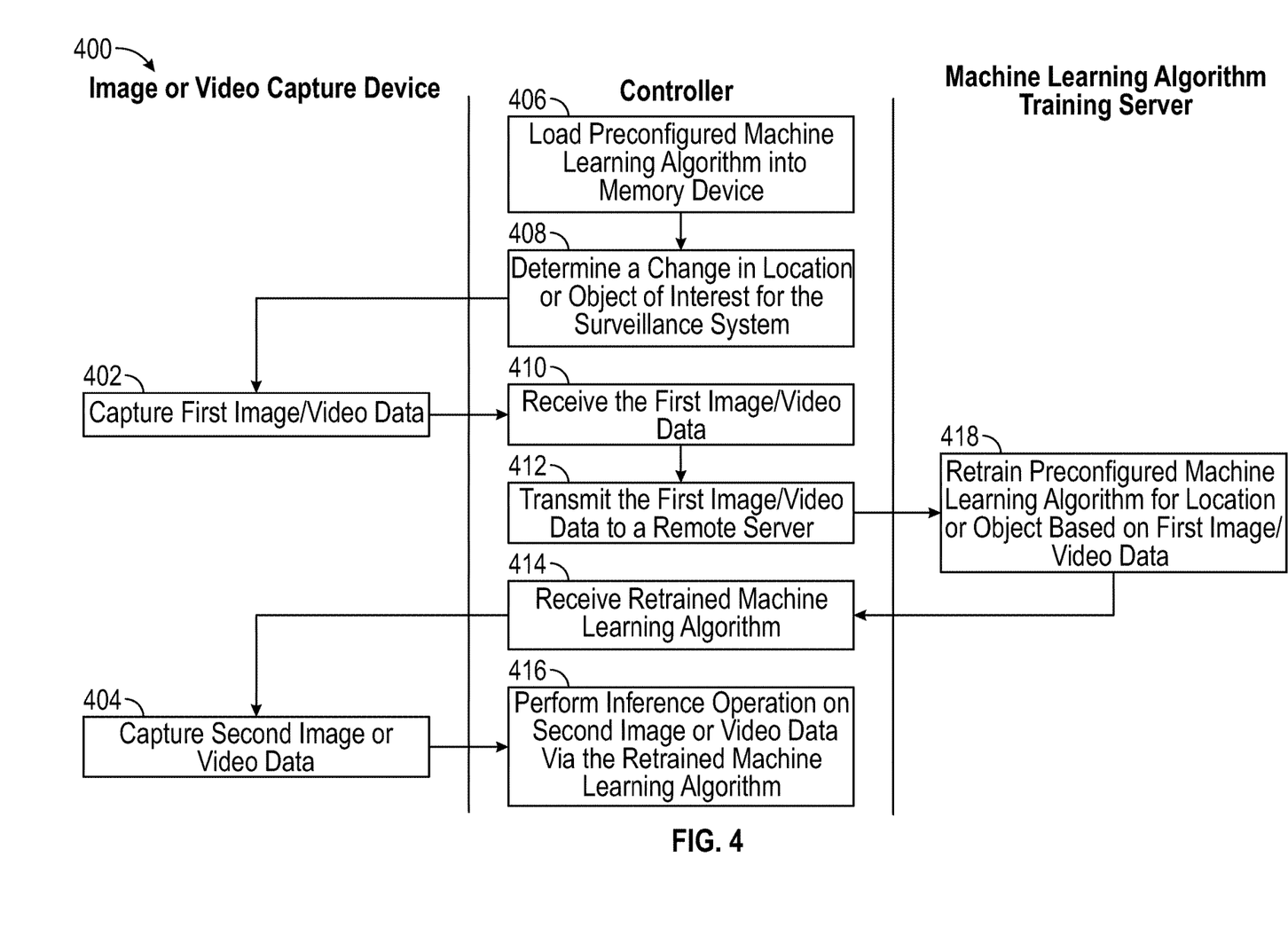
FIG. 4 depicts a flow diagram of retraining a neural network based on a change of location.

FIG. 4 depicts a flow diagram of a process 400 of retraining a neural network based on a change of location. The process 40 can be implemented by any system that can capture image and/or video data. For example, the process 400, in whole or in part, can be implemented by the surveillance system, a remote server, or other computing system. Although any number of systems, in whole or in part, can implement the process 400, to simplify discussion, the process 400 will be described with respect to particular systems. Further, although cases of the process 400 may be performed with respect to variations of systems comprising neural network engines, to simplify discussion, the process 400, will be described with respect to the image and/or video capture device, the controller, and a machine learning algorithm training server, such as a remote server.

At block 406, the process 400 can load a preconfigured machine learning algorithm into a memory device. For example, the process 400 can load the preconfigured machine learning algorithm, such as a neural network for the garage of FIG. 1.

At block 408, the process 400 can determine a change of location or object of interest for the surveillance system. The process 400 can determine a change of location based on a user input, a change in location data from a global positioning system, and/or a change in background data from image and/or video captured by the image and/or video capture devices. For example, the surveillance system can be moved to the living room 202 of FIG. 2. The process 400 can determine that the neural network has to be retrained to perform inference operations at the living room. In some embodiments, the change can include a view change, such as an angle change in view.

In some cases, a change of object of interest can include a change of object type, such as identifying a cat instead of a dog, or a bike instead of a car. In some cases, the change of object can be based automatically on an unidentifiable object entering into a scene. In some cases, the change of object can be based on user input, such as a user requesting inference operations for poodles instead of golden retrievers.

At block 402, the image and/or video capture device can capture first image and/or video data to be used for the retraining. The image and/or video capture device can transmit the first image and/or video data to the controller.

At block 410, the process 400 can receive the first image and/or video data from the image and/or video capture device, and at block 412, the controller can transmit the first image and/or video data to a machine learning algorithm training server, such as a remote server and/or a cloud server.

At block 418, the remote server can receive the first image and/or video data taken from the new location and retrain a neural network. Retraining the neural network can include updating weights for nodes of an existing neural network. The weights of the neural network for the previous location can be updated. In other cases, the server can retrieve a neural network for the type of location for the new location, such as retrieving a preexisting neural network for a living room. The server can then use the first image and/or video data to retrain the preexisting neural network for the living room. Responsive to the neural network being trained, the remote server can transmit the retrained neural network (e.g., the machine learning algorithm) to the controller.

In some cases, the first image and/or video data is stored on the cloud, such as the remote cloud server.

At block 414, the process 400 can receive the retrained neural network from the remote server and store the retrained neural network into a memory device.

At block 404, the image and/or video capture device can capture new image and/or video data, such as second image and/or video data, and at block 416, the controller can perform inference operations on the second image and/or video data using the retrained neural network locally. Advantageously, sensitive image and/or video data need only to be transmitted to the remote server for training, and future inference operations can be performed locally. Moreover, the data passed between the controller of the surveillance system and an external remote server is greatly reduced, resulting in reduced network throughput requirements. Furthermore, because the inferences are performed locally at block 416 using a neural network retrained for the new location, the inference operations are more accurate resulting in higher correct detections and reduced false alarms. Moreover, the processing times of the neural networks are not dependent on network latency. Thus, inference operations can be performed in more real-time, and the surveillance systems responsive to real-time streams of image and/or video data.

Surveillance System Retrained for Certain Styles

Figure 5:
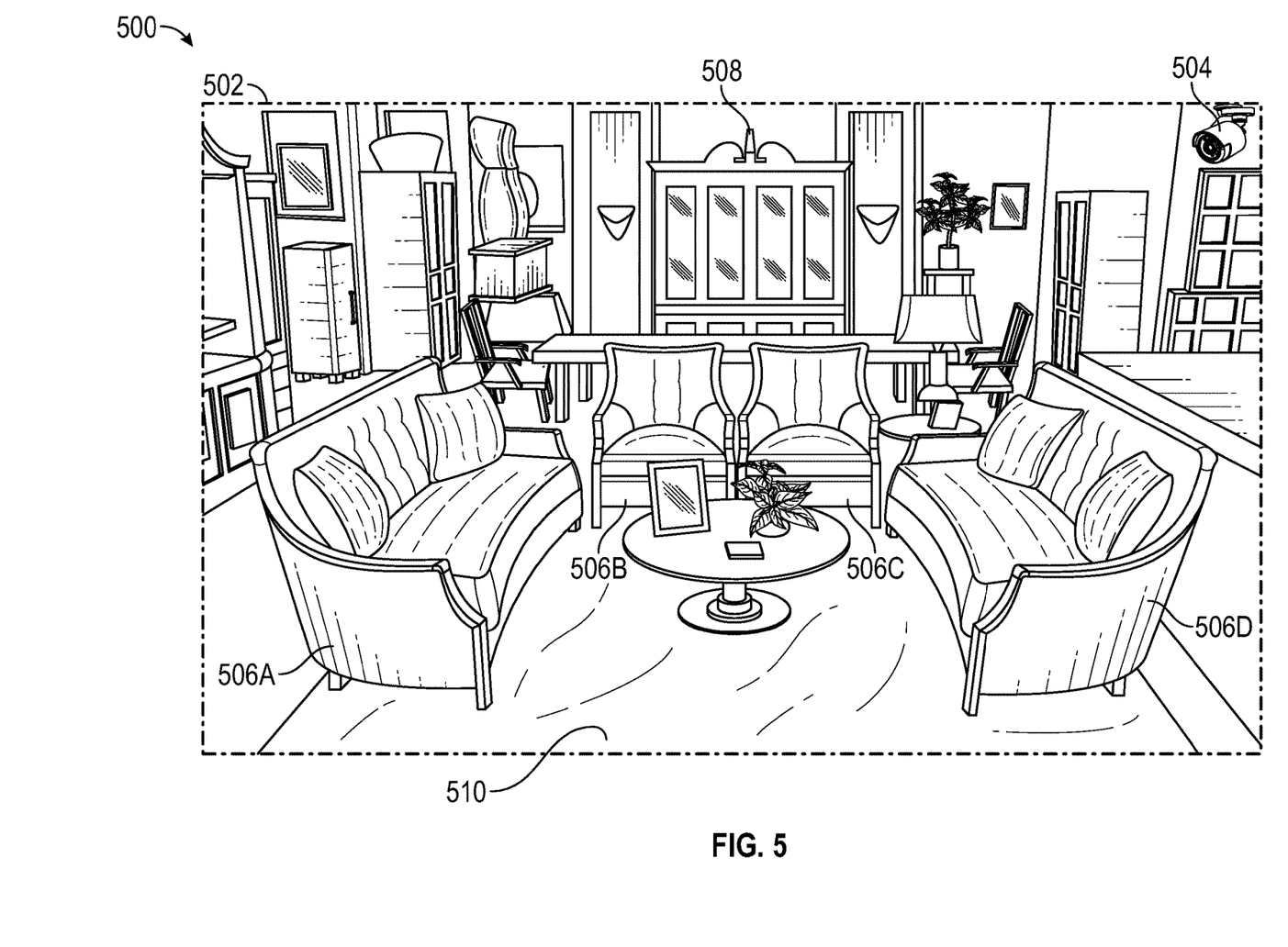
FIG. 5 depicts an illustration of a surveillance system with a neural network trained for a European style home.

FIG. 5 depicts an illustration 500 of a surveillance system with a neural network trained for a European style home. The surveillance system can be trained to perform inference operations for one or more styles. For example, in the illustration 500, the surveillance system can be installed in a living room in Europe. The neural network of the surveillance system can be trained to identify furniture typical in a European living room 502. The image and/or video capture device 504 can capture image and/or video data of the European living room 502. The surveillance system can send the image and/or video data to a remote server, and the remote server can transmit a retrained neural network back to the surveillance system. For example, the remote server can identify that the European living room 502 includes furniture that are of European style, such as the couches 506A, 506B, 506C, 506D, the rug 510, and the dish cabinet 508.

Figure 6:
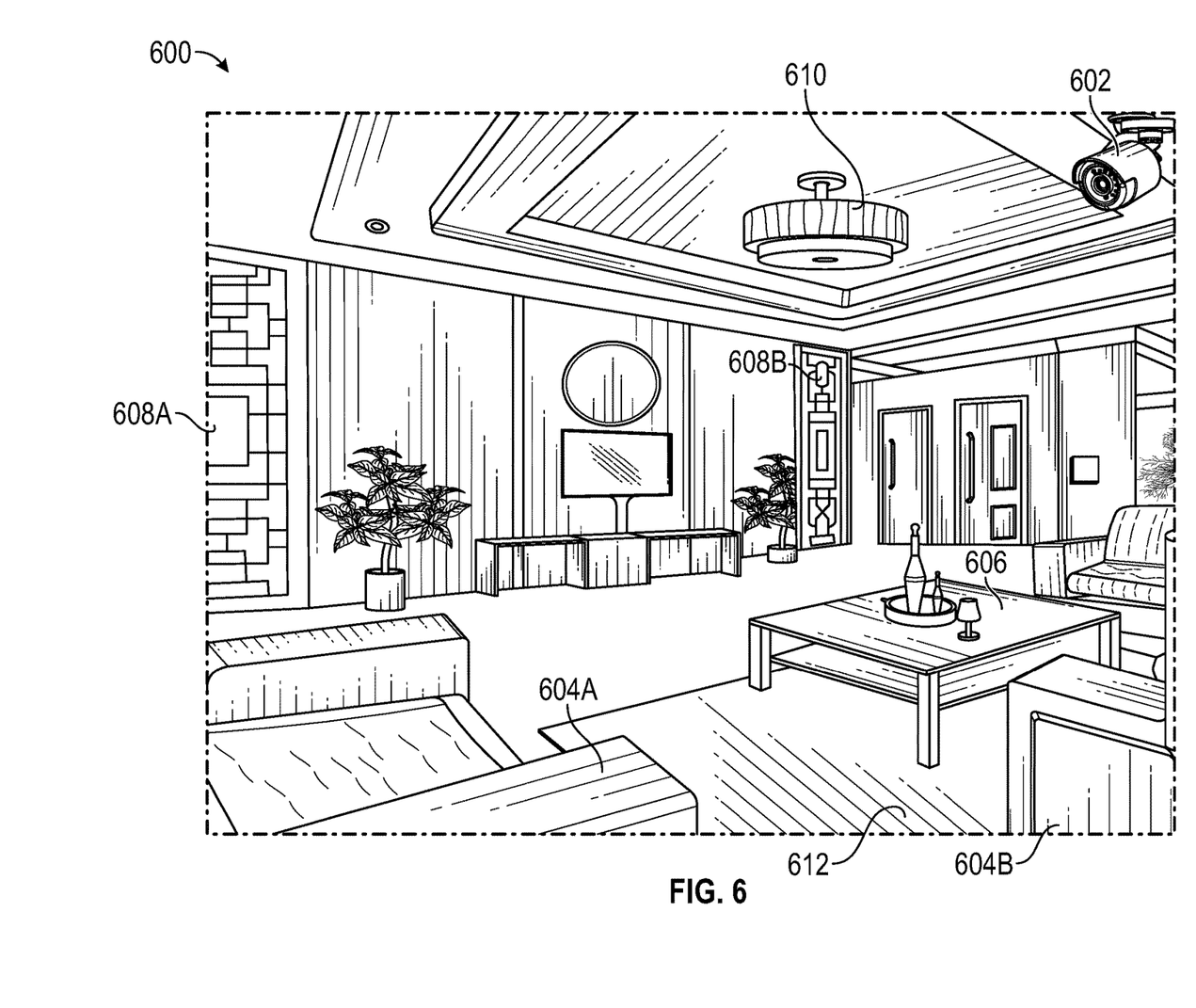
FIG. 6 depicts an illustration of a surveillance system with a neural network trained for an Asian style home.

FIG. 6 depicts an illustration 600 of a surveillance system with a neural network trained for an Asian style home. The surveillance system can determine a change of location, as described herein.

In some cases, the image and/or video capture device 504 can capture image and/or video data of the living room 502 and send the data to a controller. The controller can transmit the image and/or video data of the living room 502 to a remote server for retraining the neural network for the Asian style home. The remote server can send the retrained neural network back to the controller, and thereafter, the controller can perform inference operations specific to the Asian style living room 502. The controller can receive image and/or video data of the living room 502 and the retrained neural network can detect objects typical for an Asian style living room 502, such as a wall ornament 608A, 608B, couches 604A, 604B, a coffee table 606, and a rug 612.

Figure 7:
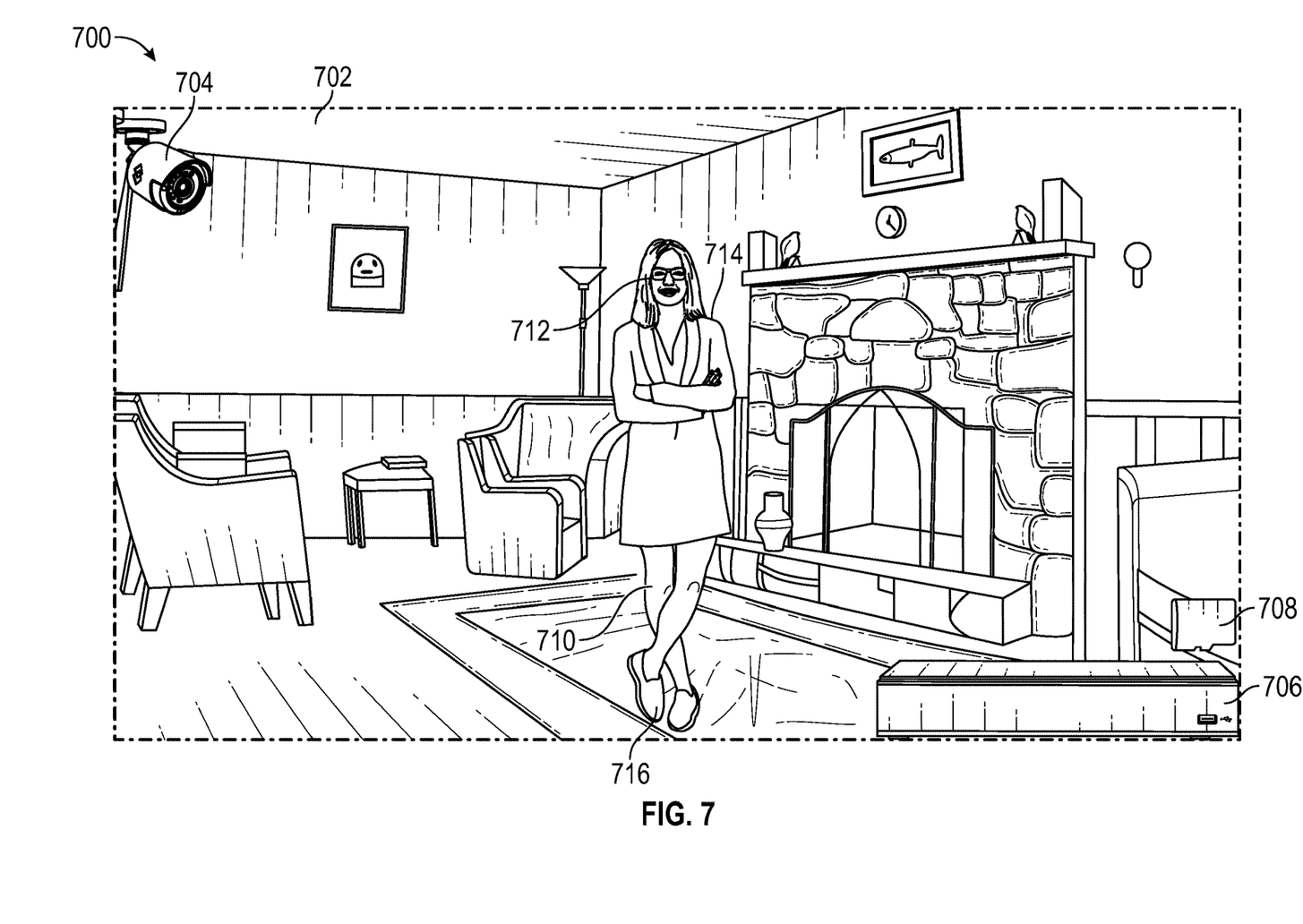
FIG. 7 depicts an illustration of a surveillance system with a neural network trained to extract specific attributes of persons.

FIG. 7 depicts an illustration 700 of a surveillance system with a neural network trained to extract specific attributes of persons. The surveillance system can send image and/or video data captured by the image and/or video capture device 704 to a remote server. The remote server can retrain the neural network to identify persons and corresponding characteristics. For example, the remote server can train the neural network to identify that a person 710 is a female, wearing a certain type of glasses 712, a brand or style of dress 714, and a type of shoes 716. The remote server can transmit the retrained neural network to the controller 706, and the controller 706 can store the retrained neural network into a memory device 708.

Preconfigured Neural Networks Stored in Controller

Figure 8:
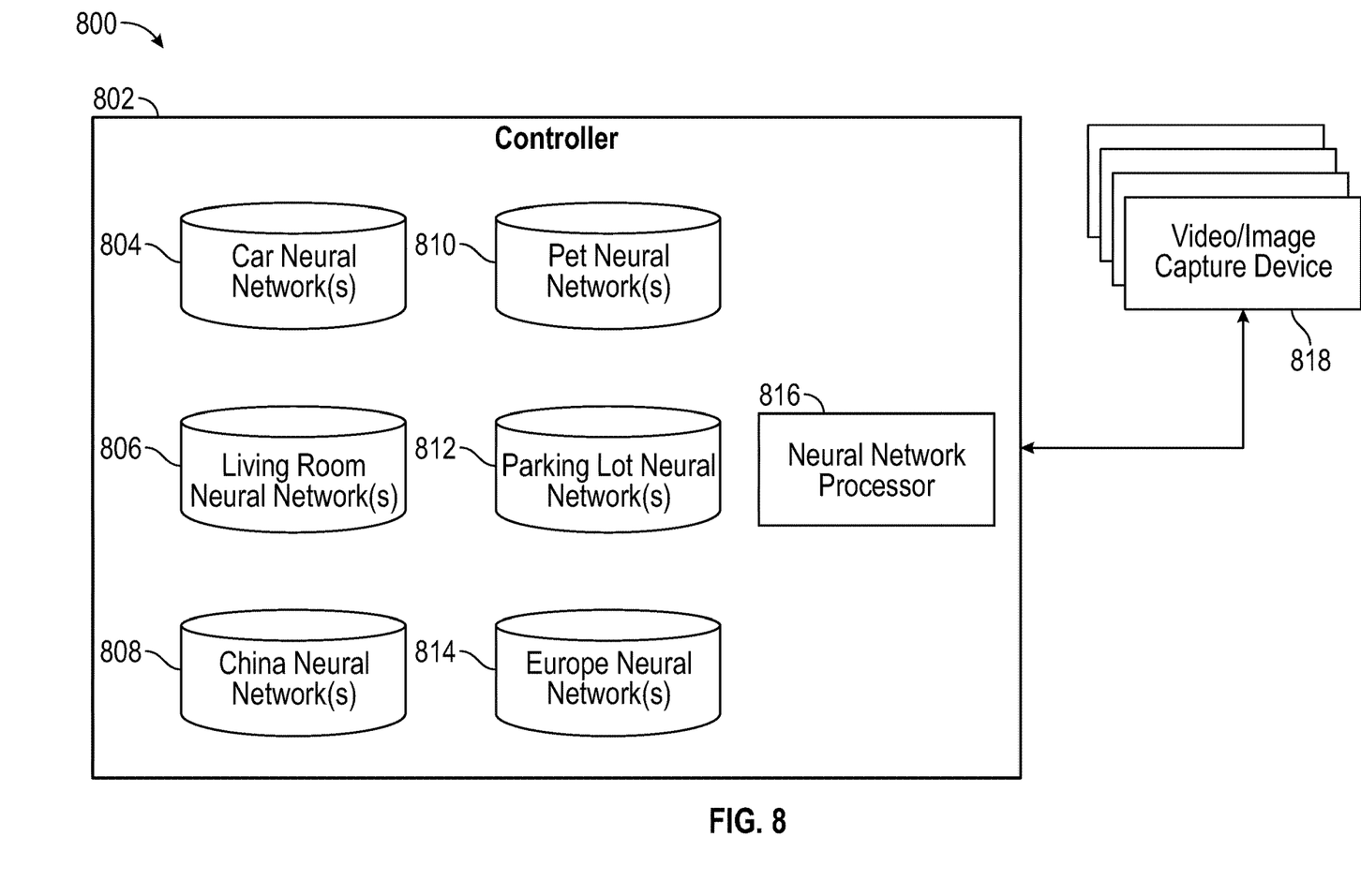
FIG. 8 depicts a block diagram of preconfigured neural networks stored in the controller.

FIG. 8 depicts a block diagram 800 of preconfigured neural networks stored in the controller. The surveillance system of block diagram 800 can include a video and/or image capture device 818, and a controller 802. The controller 802 can include a neural network processor 816, and one or more databases to store the neural network. The one or more databases can include neural networks for certain locations, styles, and/or object types. For example, the one or more databases can include a car neural network(s) 804, a pet neural network(s) 810, a living room neural network(s) 806, a parking lot neural network(s) 812, a China neural network(s) 808, a European neural network(s) 814, and/or the like.

In some cases, the surveillance system captures image and/or video data from the video and/or image capture device 818. The controller receives the image and/or video data and can determine the most familiar scene, object, or style based on the image and/or video data. For example, the controller can process the image and/or video data through an image and/or video data processor, such as a neural network for general identification of objects, styles, or locations. Based on an identification of a certain general object, such as a car and a pet, the controller 802 can retrieve the car neural network(s) 804 and/or a pet neural network(s) 810 for more accurate detection of cars or pets. Based on a determination of a location type such as a living room or a parking lot, the controller 802 can retrieve the living room neural network(s) 806 or the parking lot neural network(s) 812. Based on a determination of a certain style (e.g., from user input, locational data, or identification of certain objects in the image and/or video data), the surveillance system can retrieve a China neural network(s) 808 or a Europe neural network(s) 814.

In some cases, the preconfigured neural networks can be retrieved by the controller with preloaded weights and models. In the case of FIG. 8, the preconfigured neural networks are stored locally at the controller 802.

In some cases, the preconfigured neural networks can be stored in a memory device within the controller. In some cases, the preconfigured neural networks can be stored in a memory device external to the controller but located in the same location as the surveillance system.

Preconfigured Neural Networks Stored in Local Server

Figure 9:
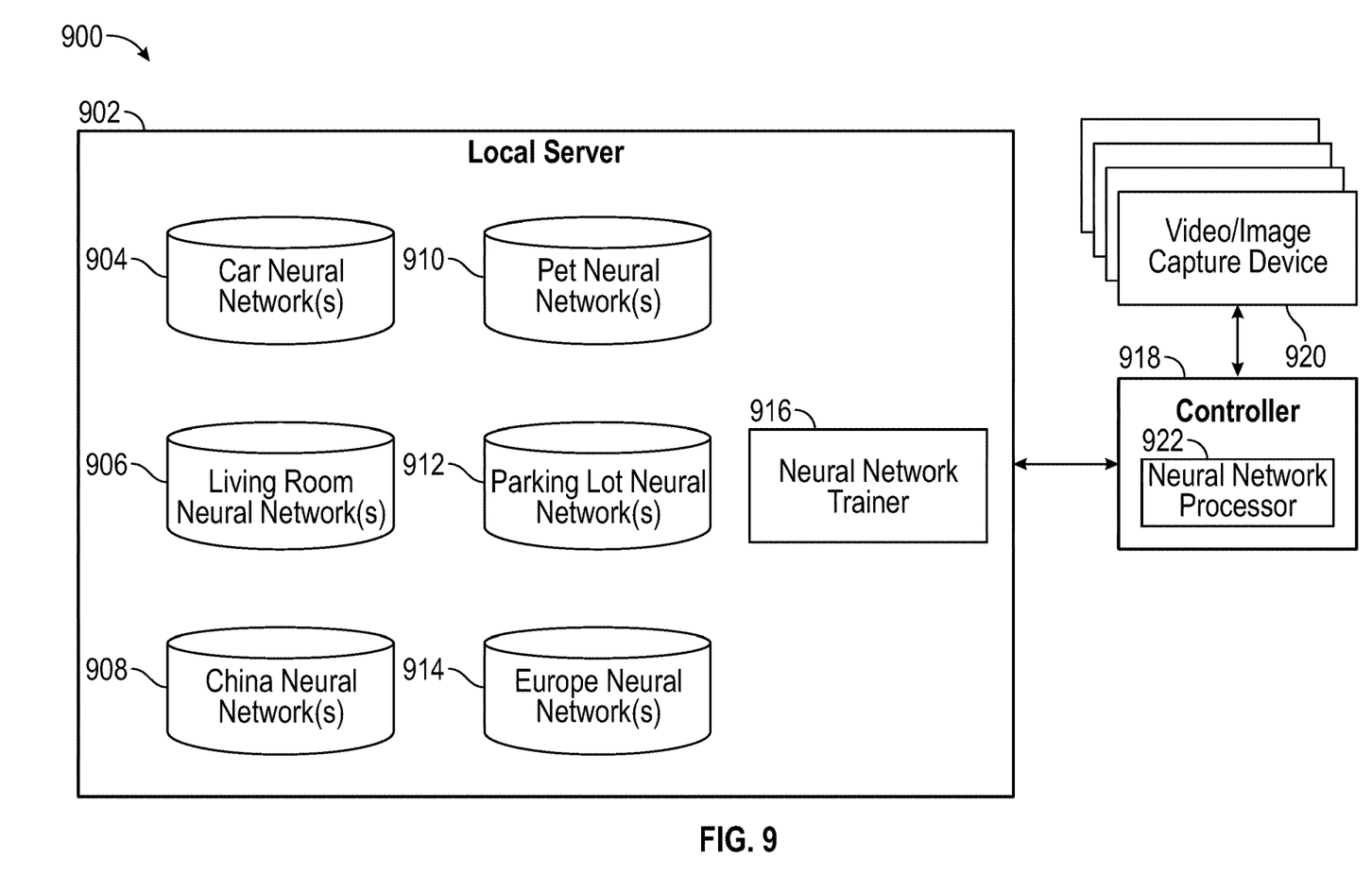
FIG. 9 depicts a block diagram of preconfigured neural networks stored in a local server.

FIG. 9 depicts a block diagram 900 of preconfigured neural networks stored in a local server. The surveillance system of block diagram 900 can include a video and/or image capture device 920, a controller 918, and a local server 902. The local server 902 can include a neural network trainer 916, and one or more databases to store the neural network. The one or more databases can include neural networks for certain locations, styles, and/or object types. For example, the one or more databases can include a car neural network(s) 904, a pet neural network(s) 910, a living room neural network(s) 906, a parking lot neural network(s) 912, a China neural network(s) 908, a European neural network(s) 914, and/or the like. The controller 918 can include a neural network processor 922.

In some cases, the surveillance system can retrieve video and/or image data from the video and/or image capture device 920. The surveillance system can transmit the video and/or image data to the controller 918 and thereafter to the local server 902. The controller can indicate a need to retrain the neural network to the local server 902.

In some cases, the local server 902 can retrieve preloaded neural networks, such as a car neural network(s) 904, a pet neural network(s) 910, a living room neural network(s) 906, a parking lot neural network(s) 912, a China neural network(s) 908, a European neural network(s) 914, and/or the like based on a certain indication of an object, style, or location (such as from locational data of a global positioning system). The neural network trainer 916 can retrain the neural networks specific to the image and/or video data captured by the video and/or image capture device 920. The local server 902 can transmit the retrained neural network back to the controller 918, and the controller can perform inference operations via its neural network processor 922.

Other Variations

Those skilled in the art will appreciate that in some cases additional system components can be utilized, and disclosed system components can be combined or omitted. Although some embodiments describe video data transmission, disclosed systems and methods can be used for transmission of any type of data. The actual steps taken in the disclosed processes may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection.

Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (such as, DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, references to "a method" or "an embodiment" throughout are not intended to mean the same method or same embodiment, unless the context clearly indicates otherwise.

The corresponding structures, materials, acts, and equivalents of all means or step plus function elements in the claims below are intended to include any structure, material, or act for performing the function in combination with other claimed elements as specifically claimed. The description of the various embodiments of the present disclosure has been presented for purposes of illustration and description, but is not intended to be exhaustive or limited to the embodiments disclosed. Many modifications and variations will be apparent to those of ordinary skill in the art without departing from the scope and spirit of this disclosure. The example embodiments were chosen and described in order to best explain the principles of this disclosure and the practical application, and to enable others of ordinary skill in the art to understand this disclosure for various embodiments with various modifications as are suited to the particular use contemplated.

Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims. In addition, the use of language in the form of "at least one of A and B" in the following claims should be understood to mean "only A, only B, or both A and B."

What is claimed is:

1. A surveillance system, comprising:
   at least one image or video capture device; and
   a controller configured to:

determine a change in location for the at least one image or video capture device from a first location to a second location different from the first location;

transmit first image or video data to a server, the first image or video data received from the at least one image or video capture device at the second location;

receive, from the server, a preconfigured neural network or weights for the preconfigured neural network responsive to the change in the location;

change at least one object to be detected in image or video data captured by the at least one image or video capture device at the second location as compared to previous image or video data captured by the at least one image or video capture device at the first location;

receive second image or video data from the at least one image or video capture device at the changed location; and perform an inference operation on the second image or video data to detect the at least one object by processing the second image or video data using the weights or the preconfigured neural network received from the server.

2. The surveillance system of claim 1, wherein in response to determining the change in location, the controller is further configured to determine to transmit the first image or video data to the server.

3. The surveillance system of claim 1, wherein the controller is further configured to determine the change in the location based at least in part on at least one of user input, data received from a Global Positioning System (GPS) device, and a change in background of the first image or video data.

4. The surveillance system of claim 1, wherein the controller is further configured to perform at least one of identifying an object absent from the first image or video data and determining a style of a room in the first image or video data.

5. The surveillance system of claim 1, wherein the server is further configured to retrain the preconfigured neural network based on the first image or video data at the second location.

6. The surveillance system of claim 1, wherein the controller is further configured to:
receive third image or video data from the at least one image or video capture device; and
determine that a view of the at least one image or video capture device has changed by at least in part performing the inference operation on the third image or video data.

7. The surveillance system of claim 1, wherein the server is configured to select the preconfigured neural network from a plurality of preconfigured neural networks based at least in part on whether a particular object is detected in the first image or video data at the second location.

8. A surveillance system, comprising:
at least one image or video capture device; and
a controller configured to:
determine a change in location for the at least one image or video capture device from a first location to a second location different from the first location;
in response to the change in location, obtain a preconfigured neural network or weights for the preconfigured neural network based at least in part on first image or video data received from the at least one image or video capture device at the second location;

change at least one object to be detected in image or video data captured by the at least one image or video capture device at the second location as compared to previous image or video data captured by the at least one image or video capture device at the first location;

receive second image or video data from the at least one image or video capture device at the second location; and perform an inference operation on the second image or video data to detect the at least one object by processing the second image or video data using the obtained weights or the obtained preconfigured neural network.

9. The surveillance system of claim 8, further comprising a memory device; and
wherein the controller is further configured to obtain the preconfigured neural network or the weights for the preconfigured neural network from the memory device.

10. The surveillance system of claim 8, wherein the controller is further configured to receive the preconfigured neural network or the weights for the preconfigured neural network from a server.

11. The surveillance system of claim 8, wherein the controller is further configured to obtain the preconfigured neural network or the weights for the preconfigured neural network by at least in part:
transmitting the first image or video data to a server; and
receiving the preconfigured neural network or the weights for the preconfigured neural network from the server based at least in part on the first image or video data transmitted to the server.

12. The surveillance system of claim 8, wherein the controller is further configured to generate the weights by retraining the preconfigured neural network using at least in part the first image or video data.

13. The surveillance system of claim 8, wherein the controller is further configured to determine the change in the location based at least in part on at least one of user input, data received from a Global Positioning System (GPS) device, and a change in background of the first image or video data.

14. The surveillance system of claim 8, wherein the controller is further configured to perform at least one of identifying an object absent from the first image or video data, determining a location type for the first image or video data, and determining a style of a room in the first image or video data.

15. The surveillance system of claim 8, wherein the controller is further configured to:
receive third image or video data from the at least one image or video capture device; and
determine that a view of the at least one image or video capture device has changed by at least in part performing the inference operation on the third image or video data.

16. A surveillance system, comprising:
at least one image or video capture device; and
means for:
determining a change in location for the at least one image or video capture device from a first location to a second location different from the first location based at least in part on a change in background of first image or video data received from the at least one image or video capture device at the second location;

in response to the change in location, obtaining a preconfigured neural network or weights for the preconfigured neural network based at least in part on the received first image or video data at the second location;

changing at least one object to be detected in image or video data captured by the at least one image or video capture device at the second location as compared to previous image or video data captured by the at least one image or video capture device at the first location;

receiving second image or video data from the at least one image or video capture device at the second location; and performing an inference operation on the second image or video data to detect the at least one object by processing the second image or video data using the obtained weights or the obtained preconfigured neural network.

17. The surveillance system of claim 16, further comprising means for determining the change in the location based at least in part on at least one of user input and data received from a Global Positioning System (GPS) device.

* * * * *